United States Patent
Yang

(10) Patent No.: US 7,173,835 B1
(45) Date of Patent: Feb. 6, 2007

(54) CONTROL CIRCUIT ASSOCIATED WITH SATURABLE INDUCTOR OPERATED AS SYNCHRONOUS RECTIFIER FORWARD POWER CONVERTER

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/281,050

(22) Filed: Nov. 16, 2005

(51) Int. Cl.
*H02M 7/217* (2006.01)

(52) U.S. Cl. .......................... 363/89; 363/127
(58) Field of Classification Search ............ 363/21.06, 363/21.14, 84, 89, 125, 127
See application file for complete search history.

(56) References Cited

U.S. PATENT DOCUMENTS 5,774,350 A * 6/1998 Notaro et al. ................. 363/89
5,818,704 A * 10/1998 Martinez .................. 363/21.06
5,999,420 A * 12/1999 Aonuma et al. .......... 363/21.06
6,026,005 A 2/2000 Abdoulin ..................... 363/89
6,912,143 B2 * 6/2005 Gan et al. ..................... 363/89
6,961,253 B1 * 11/2005 Cohen .......................... 363/89

* cited by examiner

*Primary Examiner*—Adolf Berhane
(74) *Attorney, Agent, or Firm*—J.C. Patents

(57) ABSTRACT

A circuit for synchronous rectifying is provided for forward power converter. A secondary winding of a transformer includes a first terminal and a second terminal for generating a switching voltage. A saturable inductor is coupled from the second terminal to a third terminal for providing a delay time. A first transistor is coupled from the first terminal to a ground terminal. A second transistor is connected from the third terminal to the ground terminal. The first and second transistors operate as synchronous rectifiers. An inductor is equipped from the third terminal to an output terminal of the forward power converter. Furthermore, a current-sensing device generates a current signal in response to an inductor current of the inductor. A control circuit receives the switching voltage and the current signal for generating a plurality of signals for driving a plurality of transistors, respectively.

18 Claims, 9 Drawing Sheets

CONTROL CIRCUIT ASSOCIATED WITH SATURABLE INDUCTOR OPERATED AS SYNCHRONOUS RECTIFIER FORWARD POWER CONVERTER

BACKGROUND OF THE INVENTION

1. Filed of the Invention

The present invention relates to a control circuit of forward power converter, and more particularly, to a synchronous rectifier control circuit for a forward power converter for improving efficiency of power conversion.

2. Description of the Related Art

Power converters have been frequently used for converting an unregulated power source to a constant voltage source and/or a constant current source. A transformer having a primary winding and a secondary winding is typically used for power conversion. In a typical application, the primary winding is coupled to an unregulated power source, preferably a DC voltage source, and a switching device is connected to the primary winding for switching on and off the conduction between the power source and the primary winding. A rectifying diode is typically connected to the secondary winding for rectifying the energy converted from the primary winding into a DC voltage. However, a forward voltage drop across the rectifying diode inevitably causes a conduction loss and renders the rectifying diode as the key component for producing the loss. To resolve the problem of power loss, low-on-resistance transistor has been used to replace the rectifying diode and to provide a synchronous rectification of power converter. Recently, a synchronous rectifying technique is proposed in "Single ended forward converter with synchronous rectification and delay circuit in phase-locked loop" by Edgar Abdoulin, U.S. Pat. No. 6,026,005. However, the drawback of the aforementioned conventional synchronous rectifying technique is the reduced power efficiency under light load conditions. Furthermore, a cross conduction may occur during heavy load operations.

FIG. 1 illustrates a conventional forward power converter having a synchronous rectifier (SR). The forward power converter comprises a transformer 10, a plurality of switching devices 20, 30 for controlling the conduction between the primary winding of the transformer 10, and an input voltage source $V_{IN}$. A plurality of diodes 25 and 35 are applied for retrieving the inductance energy of the primary winding back to the input voltage source $V_{IN}$. Two transistors 60, 70, operating as a synchronous rectifier, are connected to the secondary winding of the transformer 10. The first transistor 60 is coupled between a first terminal of the secondary winding and a ground terminal. The second transistor 70 is connected from a second terminal of the secondary winding to the ground terminal. An inductor 80 is coupled between the second terminal of the secondary winding and an output terminal of the power converter. An output capacitor 85 is disposed between the output terminal of the power converter and the ground terminal. FIG. 1A illustrates the first operational stage of the conventional power converter. In this stage the switching devices 20 and 30 are turned on to conduct energy from the input voltage source $V_{IN}$ to the output terminal of the power converter through the transformer 10 and the inductor 80. The transistor 60 is turned on to operate as a synchronous rectifier after its parasitic diode 65 is conducting. FIG. 1B illustrates the second operational stage of the conventional power converter. In this stage the switching devices 20, 30 are turned off. The energy stored in the inductor 80 is continuously discharged to the output terminal of the power converter through a parasitic diode 75 of the transistor 70. The transistor 70 is turned on to operate as a synchronous rectifier after its parasitic diode 75 is conducting.

The forward power converter normally has two different operation modes, namely a discontinuous operation mode and a continuous operation mode. In the continuous operation mode, the energy remains in the inductor 80, that is, the next cycle begins before the current released from the inductor 80 reaches zero. Because the transistor 75 is switched on to operate as a synchronous rectifier during the second operation stage, therefore, a cross conduction may occur after the start of the next cycle as illustrated in FIG. 2A, in which the secondary winding is short-circuited through the transistor 70 and the parasitic diode 65. During cross conduction, an EMI (electromagnetic interference) shall be generated and the lifespan of the transistors 70, 60 shall be severely reduced. In contrast, while in the discontinuous operation mode, all of the energy stored in the inductor 80 is completely discharged before the next cycle starts. Therefore, no inducted voltage remains in the inductor 80 to resist the energy of the output capacitor 85 discharging back to the transformer 10. As illustrated in FIG. 2B, when the power converter is in discontinuous operation mode under light load conditions, the energy of the inductor 80 is completely delivered at the switching instance and a reverse current shall be discharged from the output capacitor 85 to the transformer 10. The reverse current produces power losses and dramatically reduces the efficiency of power conversion. The objective of present invention is to provide a control circuit for synchronous rectifying, which has higher operation efficiency at both the continuous operation mode and the discontinuous operation mode.

SUMMARY OF THE INVENTION

A circuit for synchronous rectifying of a power converter includes a transformer having a primary winding and a secondary winding. The secondary winding includes a first terminal and a second terminal. A switching voltage is produced across the second terminal and the first terminal of the secondary winding of the transformer as the transformer is being switched. A saturable inductor is coupled from the second terminal of the secondary winding of the transformer to a third terminal. A first transistor is coupled from the first terminal of the secondary winding of the transformer to a ground terminal. Furthermore, a second transistor is coupled from the third terminal to the ground terminal. The first and second transistors operate as synchronous rectifiers. An inductor is coupled from the third terminal to an output terminal of the power converter. Furthermore, a current-sensing device generates a current signal in response to an inductor current of the inductor. A control circuit is connected to the third terminal and receives the switching voltage and the current signal for generating a first control signal and a second control signal for driving the first transistor and the second transistor, respectively. The saturable inductor provides a delay time for inhibiting a current flow from the second terminal of the secondary winding of the transformer to the second transistor when the switching voltage is generated. In addition, a diode is connected from the control circuit to the third terminal for detecting a voltage at the third terminal and providing the second control signal.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF EMBODIMENTS

Figure 1:
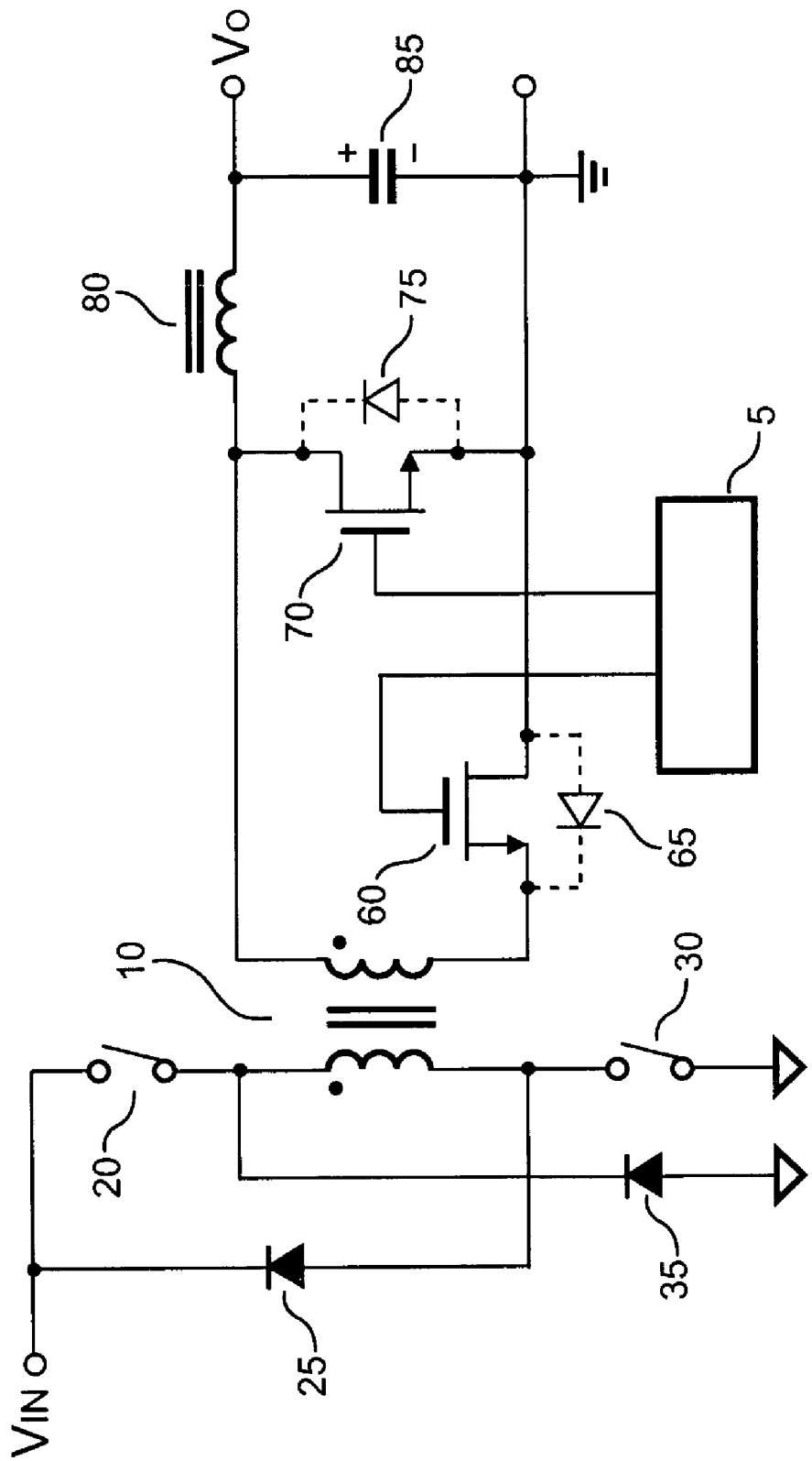
FIG. 1 illustrates a conventional forward power converter having synchronous rectifier.
Figure 1A:
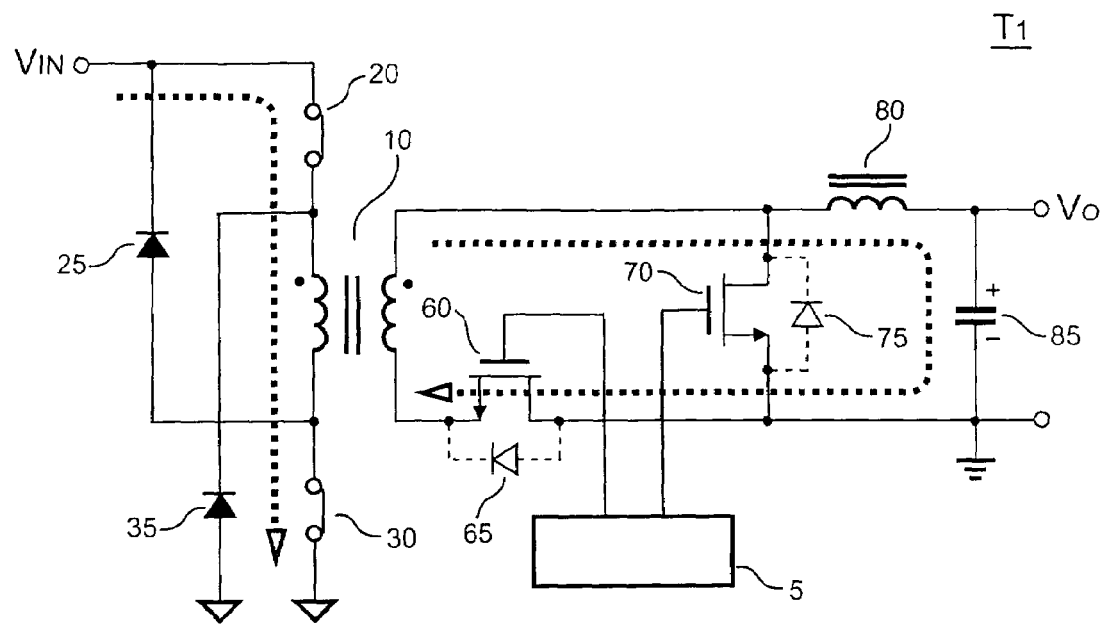
FIG. 1A illustrates the first operational stage of the conventional power converter.
Figure 1B:
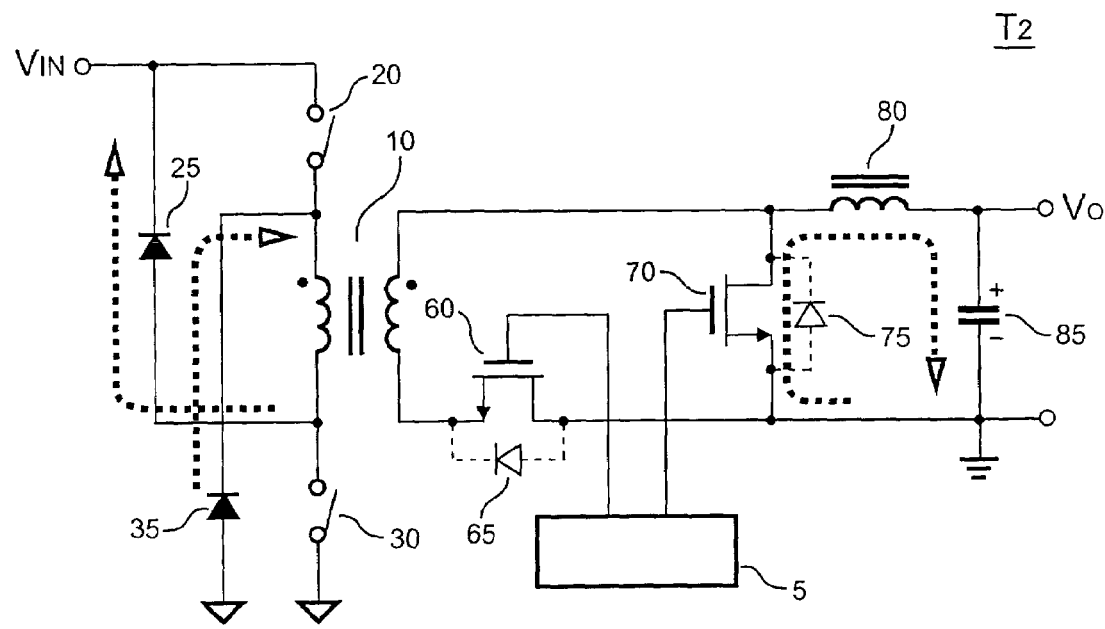
FIG. 1B illustrates the second operational stage of the conventional power converter.
Figure 2A:
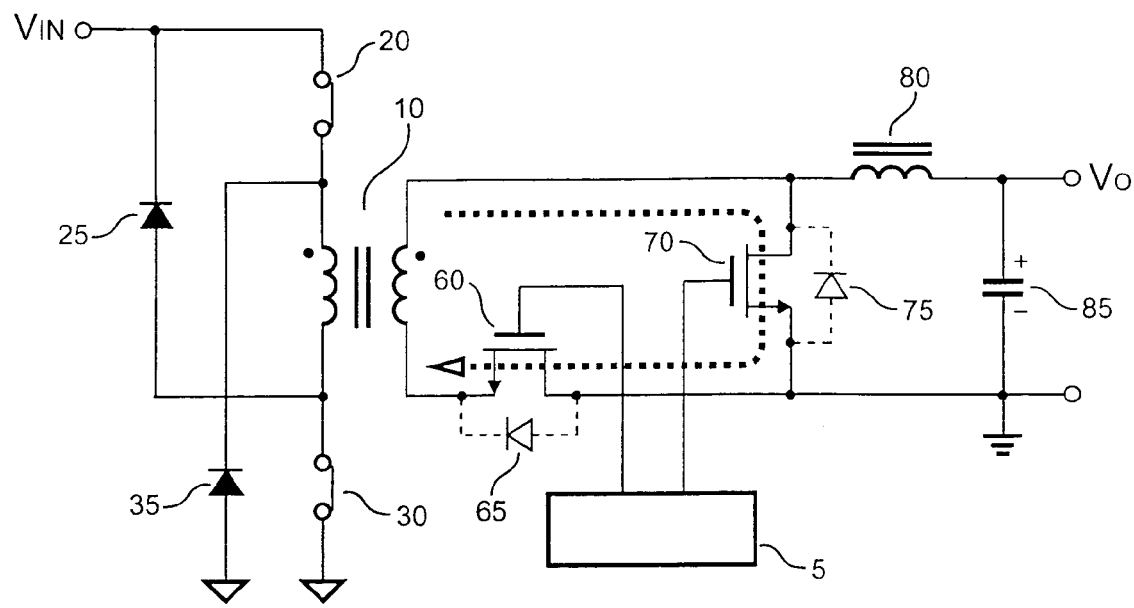
FIG. 2A illustrates a cross conduction and the operation of the conventional power converter in continuous operation mode.
Figure 2B:
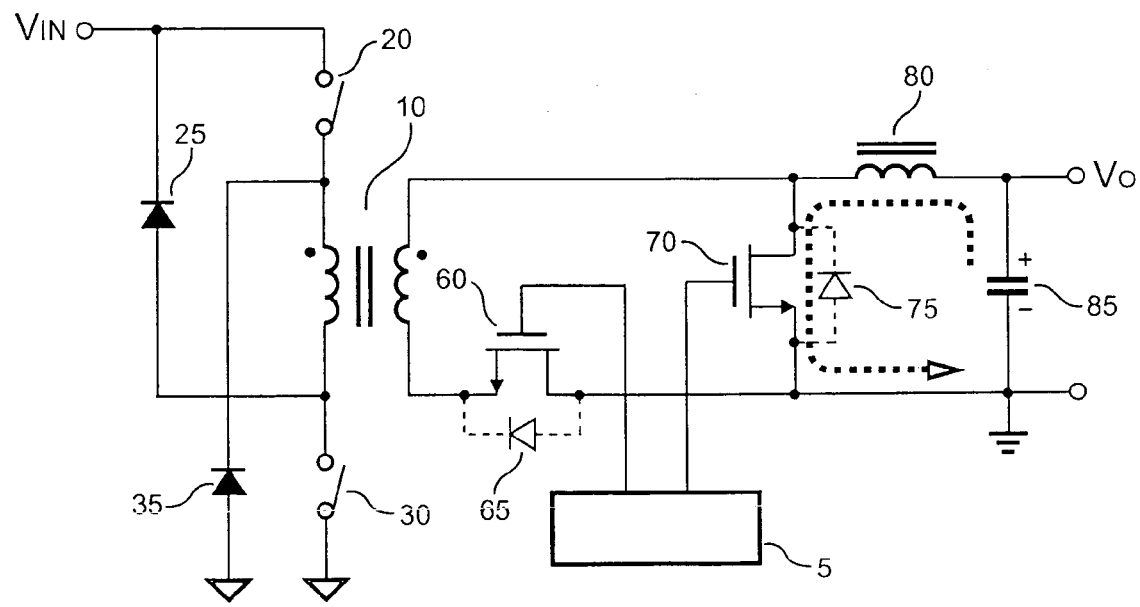
FIG. 2B illustrates the conventional power converter operating in the discontinuous operation mode during light load conditions, and the discharge of a reverse current from the output capacitor to the transformer.
Figure 3:
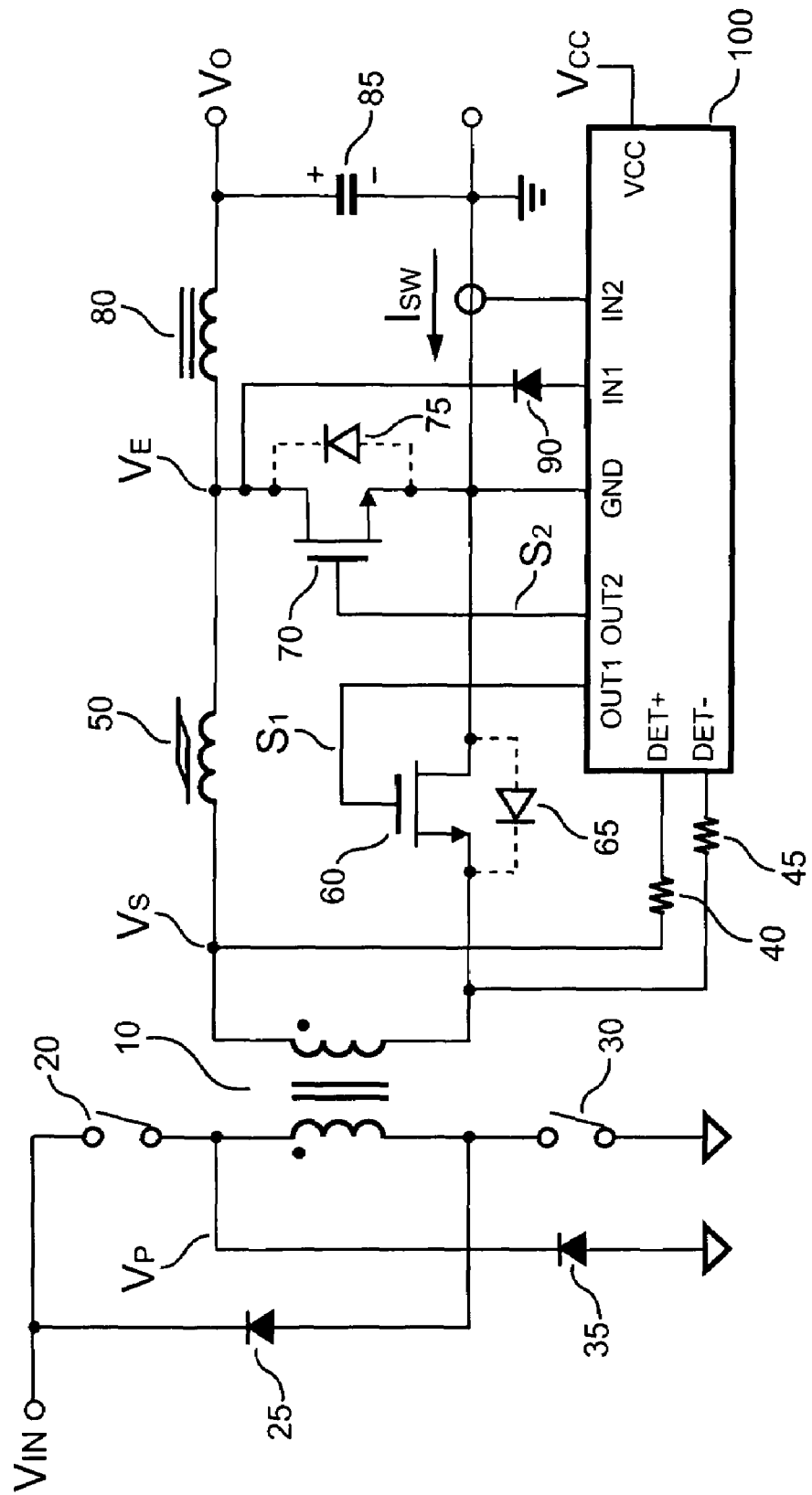
FIG. 3 is a schematic diagram of a circuit for synchronous rectifying, according to a first embodiment of the present invention.

FIG. 3 illustrates a circuit of synchronous rectifying according to a first embodiment of the present invention. The aforementioned circuit includes a transformer 10 having a primary winding and a secondary winding. The secondary winding includes a first terminal and a second terminal. A switching voltage $V_S$ is produced across the second terminal and the first terminal of the secondary winding in response to the switching of the transformer 10. A saturable inductor 50 is connected from the second terminal of the secondary winding to a third terminal. A transistor 60 is connected from the first terminal of the secondary winding to a ground terminal. A transistor 70 is connected from the third terminal to the ground terminal. An inductor 80 is connected from the third terminal to an output terminal of the power converter to generate an output voltage $V_O$. A current-sensing apparatus generates a current signal in response to the inductor current $I_{SW}$. A control circuit 100 is utilized for turning on/off the transistors 60 and 70. The control circuit 100 is coupled for receiving the switching voltage $V_S$ and the current signal for generating a first driving signal and a second driving signal to drive the transistor 60 and the transistor 70, respectively. The control circuit 100 includes a terminal DET+ connected to the second terminal of the secondary winding and a terminal DET− connected to the first terminal of the secondary winding. The terminal GND of the control circuit 100 is connected to the ground terminal. The control circuit 100 further includes a terminal IN1, and a terminal IN2, an output terminal OUT1, and an output terminal OUT2. The IN1 terminal of the control circuit 10 is connected to the transistor 70 through a diode 90 for detecting a voltage $V_E$ of the transistor 70. The terminal IN2 is utilized for detecting the current signal. The output terminals OUT1 and OUT2 produce the first control signal $S_1$ and the second control signal $S_2$ for switching the transistors 60 and 70, respectively. When the switching signal is generated, the current of the transformer 10 flows through the saturable inductor 50, the inductor 80, the output terminal of the power converter, and the diode 65. The diode 65 can be a parasitic diode of the transistor 60 and/or an external diode. At the moment that the switching signal is generated, the saturable inductor 50 provides a delay time $T_D$ that inhibits the current flow from the transformer 10 to the transistor 70, and protects the transistor 70.

Figure 4:
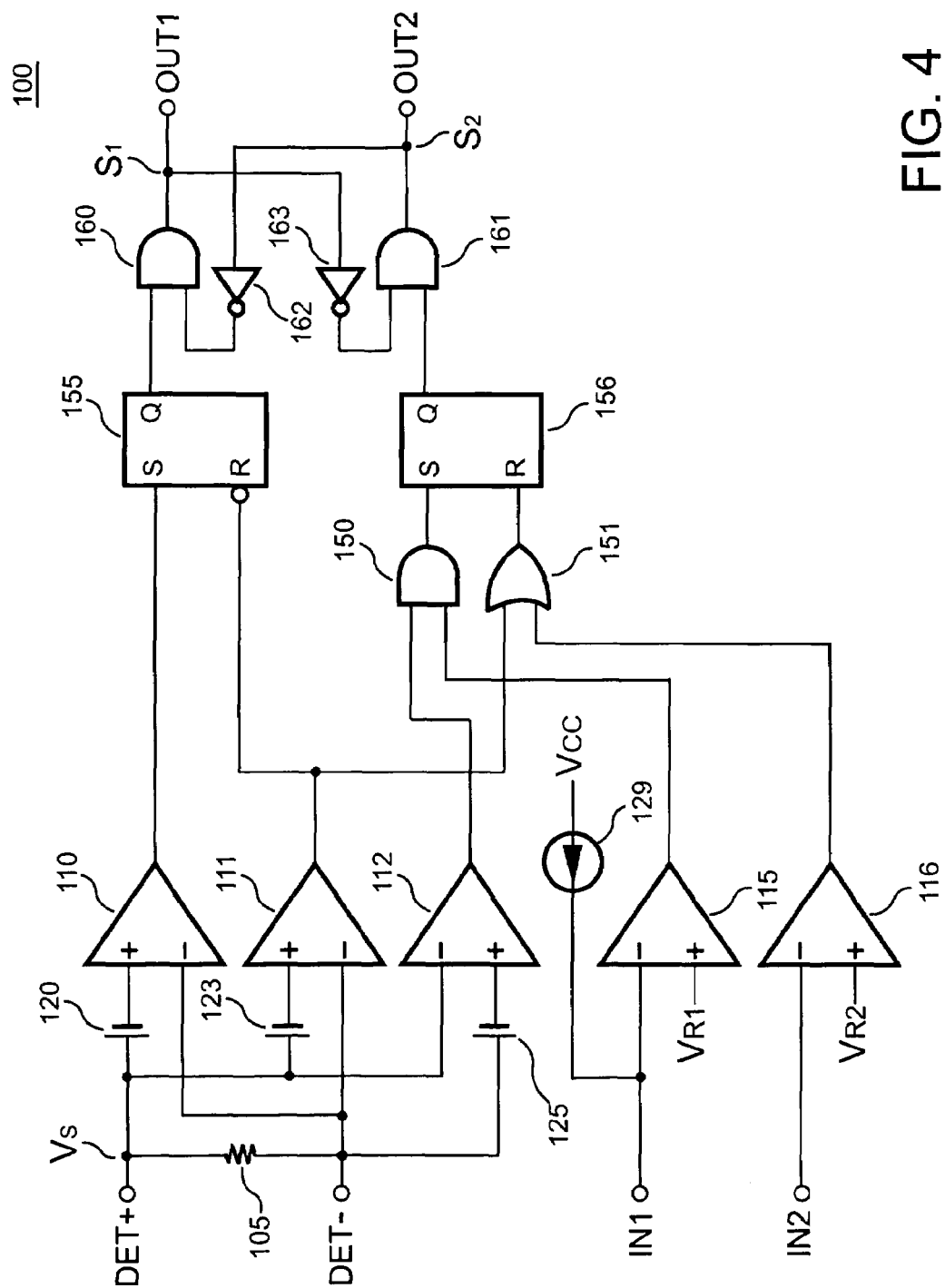
FIG. 4 illustrates a control circuit generating driving signals for synchronous rectifiers, according to the first embodiment of the present invention.

FIG. 4 illustrates the control circuit 100 that comprises a comparator 110 having a positive input connected to the terminal DET+ through a threshold 120, according to the first embodiment of the present invention. The terminal DET+ is further coupled to the second terminal of the transformer 10 via a resistor 40. A negative input of the comparator 110 is connected to the terminal DET−. The terminal DET− is further coupled to the first terminal of the transformer 10 via a resistor 45. A comparator 111 having a positive input is coupled to the terminal DET+ via a threshold 123. A negative input of the comparator 111 is connected to the terminal DET−. A comparator 112 having a positive input is coupled to the terminal DET− via a threshold 125. A negative input of the comparator 112 is connected to the terminal DET+. A comparator 115 having a positive input is coupled to a threshold $V_{R1}$. A negative input of the comparator 115 is coupled to the terminal IN1. The terminal IN1 is further coupled to the third terminal for detecting the voltage of the transistor 70. A current source 129 is coupled to the negative input of the comparator 115. A comparator 116 having a positive input is connected to a threshold $V_{R2}$. A negative input of the comparator 116 is connected to the terminal IN2 for receiving the current signal. A flip-flop 155 generates the first control signal $S_1$, in which the comparator 110 enables the first control signal $S_1$. The comparator 111 disables the first control signal $S_1$. A flip-flop 156 generates the second control signal $S_2$. The comparator 112 and the comparator 115 enable the second control signal $S_2$. The comparator 111 or the comparator 116 disables the second control signal $S_2$. An exclusive circuit including a plurality of AND gates 160, 161 and a plurality of inverters 162, 163 is applied to ensure the second control signal $S_2$ is disabled before the first control signal $S_1$ is enabled, and to ensure the first control signal $S_1$ is disabled before the second control signal $S_2$ is enabled.

Therefore, the first control signal $S_1$ is enabled after the switching voltage $V_S$ is higher than the threshold 120. The first control signal $S_1$ is disabled once the switching voltage $V_S$ is lower than the threshold 123. The second control signal $S_2$ is enabled once the voltage of the transistor 70 is lower than the threshold $V_{R1}$ and the switching voltage $V_S$ is lower than the threshold 125. The second control signal $S_2$ is disabled as long as the current signal is lower than the threshold $V_{R2}$ and/or the switching voltage $V_S$ is higher than the threshold 123.

Figure 5:
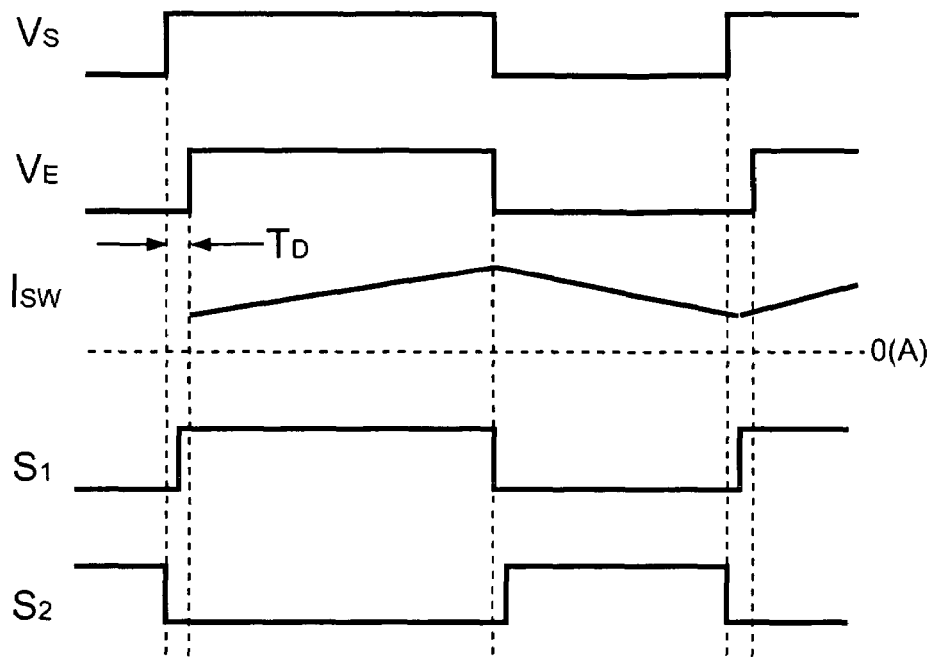
FIG. 5 illustrates a plurality of key waveforms of synchronous rectifying for power converter in continuous operation mode according to the first embodiment of the present invention.
Figure 6:
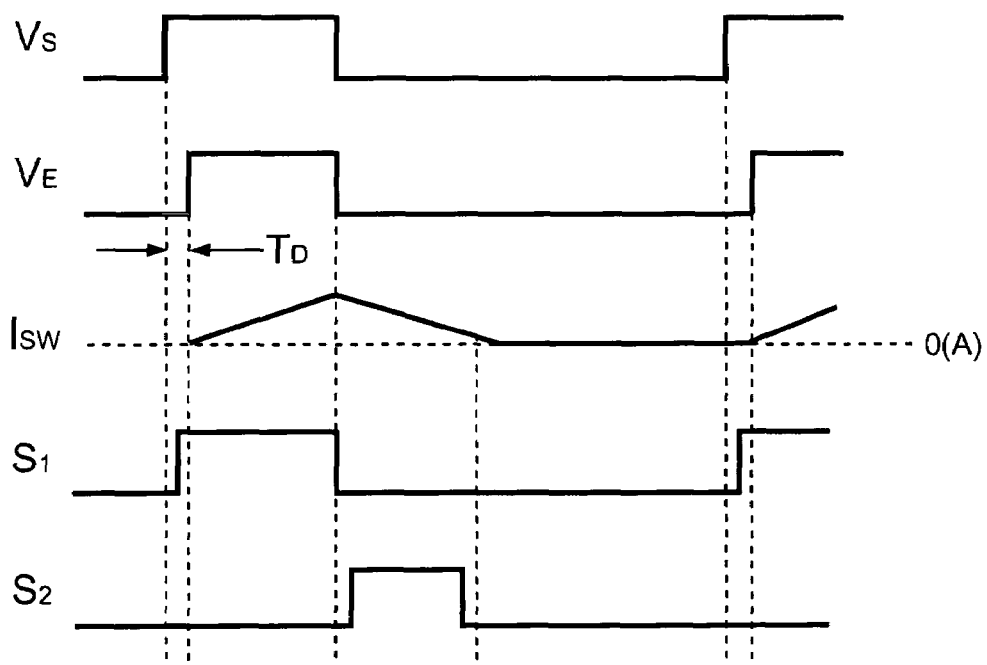
FIG. 6 illustrates a plurality of key waveforms of synchronous rectifying for power converter in discontinuous operation mode according to the first embodiment of the present invention.

FIG. 5 illustrates a plurality of key waveforms of synchronous rectifying operating in continuous operation mode according to the first embodiment of the present invention. The inductor 80 remains the energy before the next switching cycle starts. The saturable inductor 50 provides the delay time $T_D$. During the period of the delay time $T_D$, the switching voltage $V_S$ is inhibited from transferring to the third terminal and a switching current $I_{SW}$ is inhibited from flowing from the transformer 10. Therefore, the transistor 70 can be switched off before the start of the switching current $I_{SW}$. FIG. 6 illustrates a plurality of key waveforms of synchronous rectifying operating in discontinuous operation mode according to the first embodiment of the present invention. The inductor 80 is fully discharged before the inductor 80 is charged again by the switching voltage $V_S$. The discontinuous operation mode is generally applied under the light load and no load conditions. The transistor 70 is switched off before the current of inductor 80 is discharged to zero, which prevents the energy of the capacitor 85 discharging via the transistor 70 under light load operation.

Figure 7:
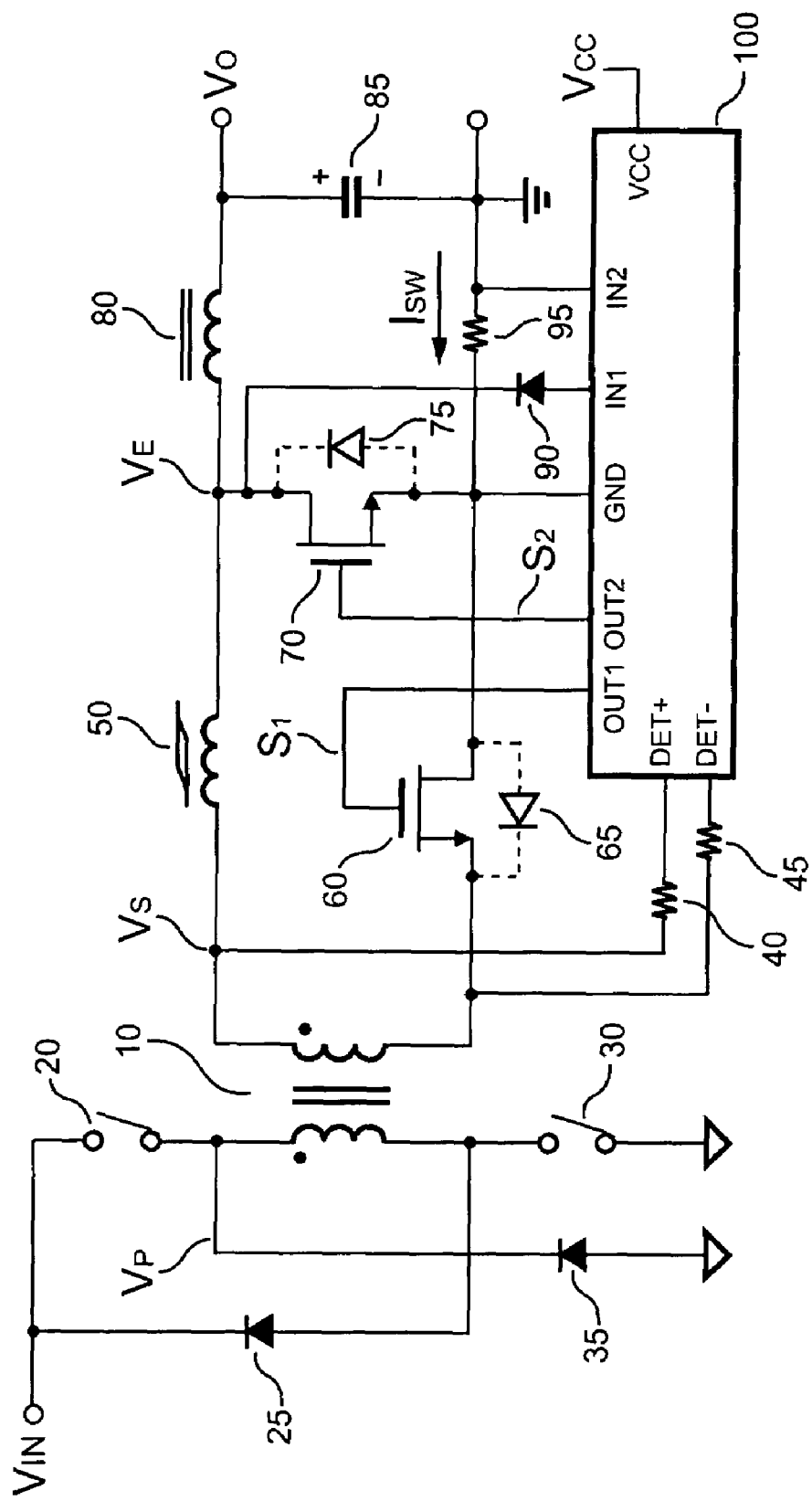
FIG. 7 illustrates a circuit for synchronous rectifying, according to a second embodiment of the present invention.
Figure 8:
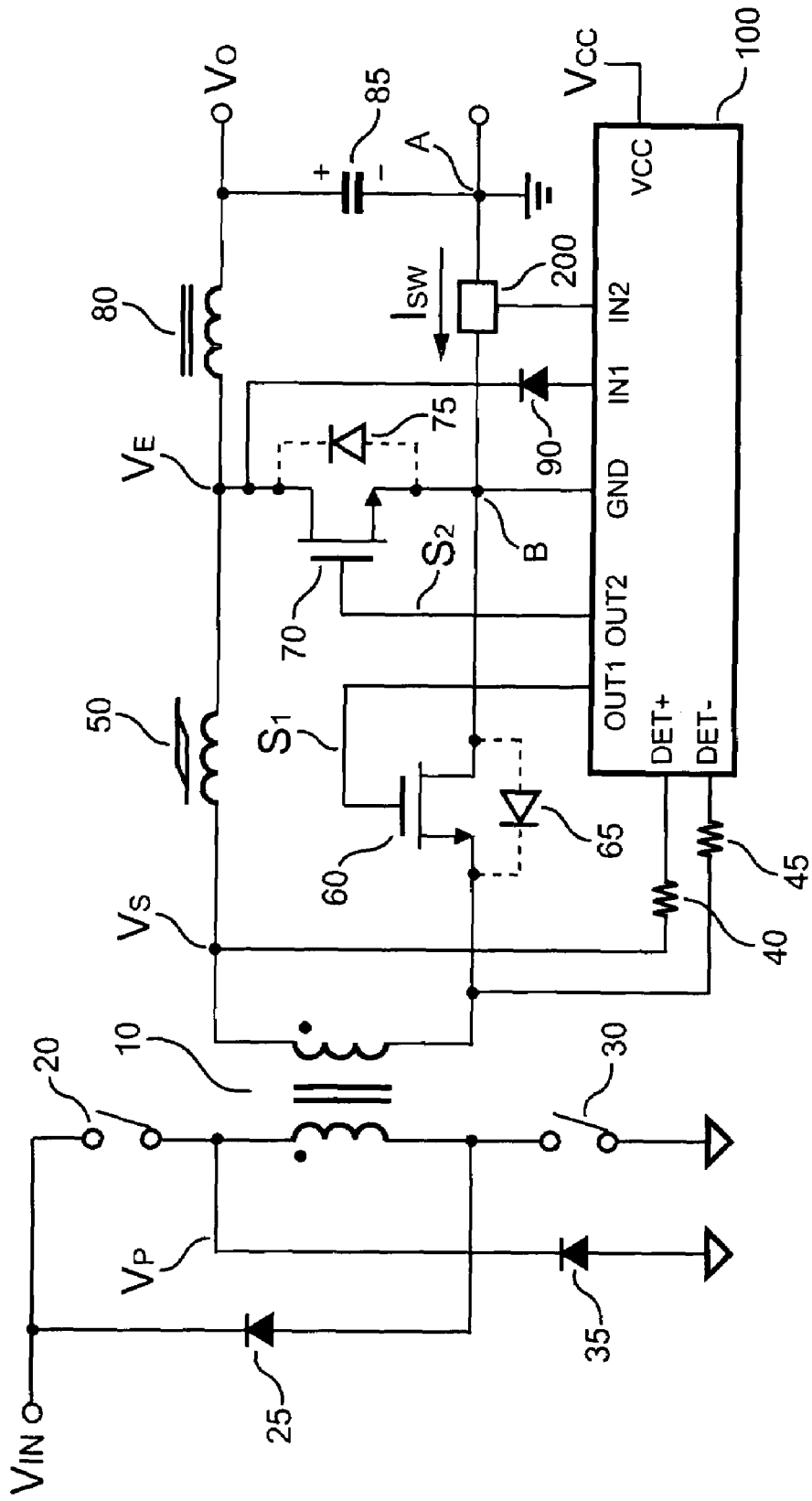
FIG. 8 illustrates a circuit for synchronous rectifying, according to a third embodiment of the present invention.
Figure 9:
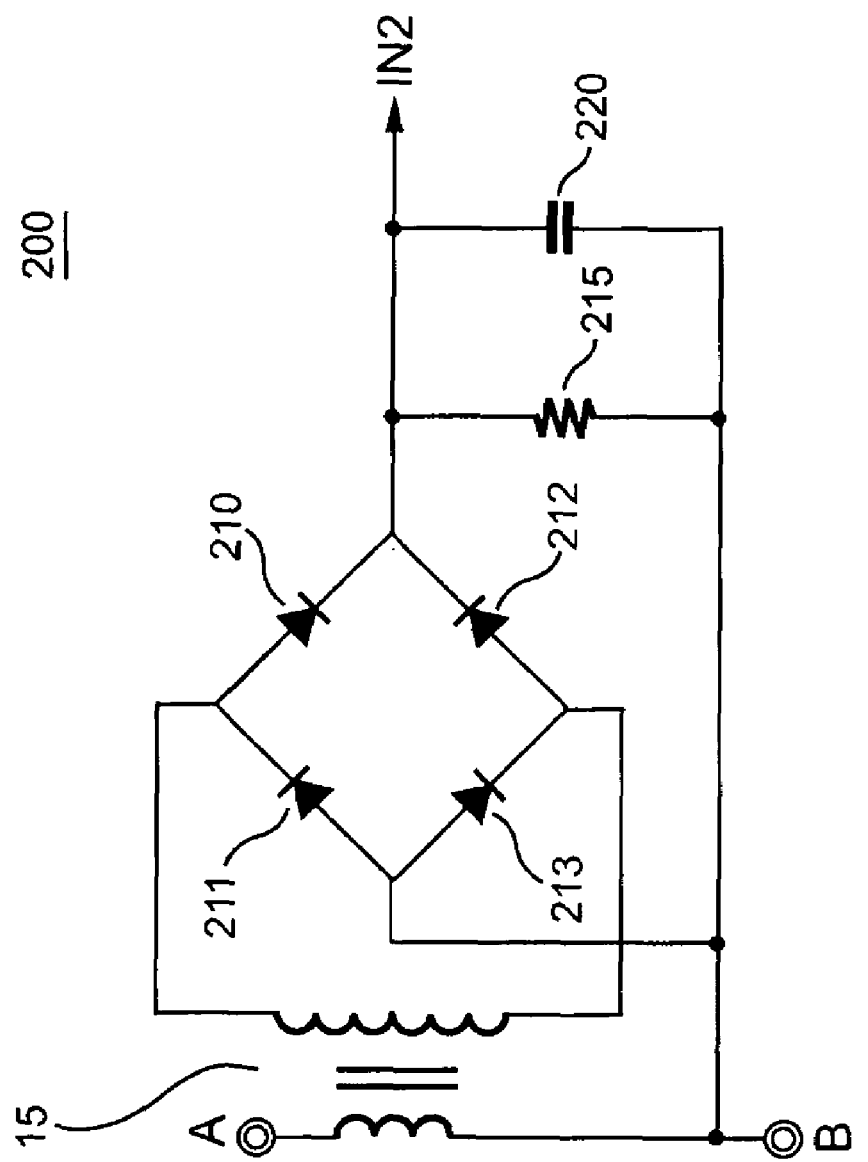
FIG. 9 illustrates a current-sensing device including a current transformer for generating a current signal according to the third embodiment of the present invention.

FIG. 7 illustrates a second embodiment of the present invention. A resistor 95 acts as the current-sensing apparatus to convert the switching current $I_{SW}$ to be a voltage signal for the control circuit 100. FIG. 8 illustrates a circuit according to a third embodiment of the present invention. A current-sensing device 200 is equipped to convert the switching current $I_{SW}$ to be a voltage signal. FIG. 9 illustrates the current-sensing device 200 according to the embodiments of the present invention. The current-sensing device 200 comprises a current transformer 15, a plurality of diodes 210-213, a resistor 215, and a capacitor 220. The current-sensing device 200 converts the switching current $I_{SW}$ and generates a signal to the terminal IN2 of the control circuit 100.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A circuit for synchronous rectifying of a power converter, comprising:
   a transformer, having a primary winding and a secondary winding, wherein said secondary winding of said transformer includes a first terminal and a second terminal, wherein a switching voltage is produced across said second terminal and said first terminal of said secondary winding of said transformer as said transformer is being switched;
   a saturable inductor, coupled from said transformer to a third terminal;
   a first transistor, coupled from said transformer to a ground terminal;
   a second transistor, coupled from said third terminal to said ground terminal;
   an inductor, coupled from said third terminal to an output terminal of said power converter;
   a current-sensing device, generating a current signal in response to an inductor current of said inductor; and
   a control circuit, operating to receive said switching voltage and said current signal for generating a first control signal and a second control signal for driving said first transistor and said second transistor, respectively; wherein said first transistor is switched on in response to said switching voltage, and said second transistor is switched off in response to said current signal;
   wherein said saturable inductor provides a delay time to inhibit a current flow from said transformer to said second transistor when said switching voltage is being generated.

2. The circuit for synchronous rectifying of claim 1, further comprising a diode connected from said control circuit to said second transistor for detecting a voltage of said second transistor.

3. The circuit for synchronous rectifying of claim 1, wherein said first control signal is enabled after said switching voltage is higher than a first threshold; said first control signal is disabled once said switching voltage is lower than a second threshold; said second control signal is enabled once a voltage of said second transistor is lower than a fourth threshold; and said second control signal is disabled as long as said current signal is lower than a fifth threshold and said switching voltage is higher than said second threshold.

4. The circuit for synchronous rectifying of claim 1, wherein said first control signal is enabled after said switching voltage is higher than a first threshold; said first control signal is disabled once said switching voltage is lower than a second threshold; said second control signal is enabled once a voltage of said second transistor is lower than a fourth threshold; said second control signal is disabled as long as said current signal is lower than a fifth threshold or said switching voltage is higher than said second threshold.

5. The circuit for synchronous rectifying of claim 1, wherein said control circuit comprises:
   a first comparator, having a positive input coupled to said second terminal of said secondary winding of said transformer via a first threshold, a negative input of said first comparator being coupled to said first terminal of said secondary winding of said transformer;
   a second comparator, having a positive input coupled to said second terminal of said secondary winding of said transformer via a second threshold, a negative input of said second comparator being coupled to said first terminal of said secondary winding of said transformer;
   a third comparator, having a positive input coupled to said first terminal of said secondary winding of said transformer via a third threshold, a negative input of said third comparator being coupled to said second terminal of said secondary winding of said transformer;
   a fourth comparator, having a positive input coupled to a fourth threshold, a negative input of said fourth comparator being coupled to said third terminal, wherein a current source is coupled to said negative input of said fourth comparator;
   a fifth comparator, having a positive input coupled to a fifth threshold, a negative input of said fifth comparator receiving said current signal;
   a first flip flop, generating said first control signal, wherein said first comparator enables said first control signal and said second comparator disables said first control signal; and
   a second flip flop, generating said second control signal, wherein said second control signal is enabled by said third comparator and said fourth comparator, said second control signal being disabled by said second comparator or said fifth comparator.

6. The circuit of synchronous rectifier of claim 1, wherein said control circuit further comprising an exclusive circuit for ensuring said second control signal being disabled before said first control signal being enabled, and for ensuring said first control signal is disabled before said second control signal being enabled.

7. A circuit of synchronous rectifier of a power converter, comprising:
   a first transistor, coupled to a secondary winding of a transformer;
   a second transistor, coupled to said first transistor;
   a saturable inductor, connected in series with said secondary winding of said transformer; wherein a switching voltage is produced across said secondary winding as said transformer is being switched;
   an inductor, coupled to said second transistor and an output terminal of said power converter;
   a current-sensing device, generating a current signal in response to an inductor current of said inductor; and
   a control circuit, operating to receive said switching voltage and said current signal for generating a first control signal and a second control signal for driving said first transistor and said second transistor, respectively.

8. The circuit of synchronous rectifier of claim 7, further comprising a diode connected from said control circuit to said second transistor for detecting a voltage of said second transistor.

9. The circuit of synchronous rectifier of claim 7, wherein said saturable inductor provides a delay time for inhibiting a current flow from said secondary winding of said transformer to said second transistor when said switching voltage is generated.

10. The circuit of synchronous rectifier as claimed in claim 7, wherein said first control signal is enabled after said switching voltage is higher than a first threshold; said first control signal is disabled once said switching voltage is lower than a second threshold; said second control signal is enabled once a voltage of said second transistor is lower than a fourth threshold; and said second control signal is disabled as long as said current signal is lower than a fifth threshold and said switching voltage is higher than said second threshold.

11. The circuit of synchronous rectifier of claim 7, wherein said first control signal is enabled after said switching voltage is higher than a first threshold; said first control signal is disabled once said switching voltage is lower than a second threshold; said second control signal is enabled once a voltage of said second transistor is lower than a fourth threshold; and said second control signal is disabled as long as said current signal is lower than a fifth threshold or switching voltage is higher than said second threshold.

12. The circuit of synchronous rectifier of claim 7, wherein said control circuit comprising:
   a first comparator, having a positive input coupled to a second terminal of said secondary winding of said transformer via a first threshold, a negative input of said first comparator being coupled to a first terminal of said secondary winding of said transformer;
   a second comparator, having a positive input coupled to said second terminal of said secondary winding of said transformer via a second threshold, a negative input of said second comparator being coupled to said first terminal of said secondary winding of said transformer;
   a third comparator, having a positive input coupled to said first terminal of said secondary winding of said transformer via a third threshold, said negative input of said third comparator being coupled to second terminal of said secondary winding of said transformer;
   a fourth comparator, having a positive input coupled to a fourth threshold, a negative input of said fourth comparator being coupled to said second transistor, wherein a current source is coupled to the negative input of the fourth comparator;
   a fifth comparator, having a positive input coupled to said fifth threshold, a negative input of said fifth comparator being coupled for receiving said current signal;
   a first flip flop, generating said first control signal, wherein said first control signal is enabled by said first comparator and said first control signal is disabled by said second comparator; and
   a second flip flop, generating said second control signal, wherein said second control signal is enabled by said third comparator and the fourth comparator, said second control signal being disabled by said second comparator or said fifth comparator.

13. The circuit of synchronous rectifier of claim 7, wherein said control circuit further comprising an exclusive circuit for ensuring said second control signal being disabled before said first control signal is enabled, and for ensuring said first control signal being disabled before said second control signal is enabled.

14. A synchronous rectifying circuit of a power converter, comprising:
   a first switch, coupled to a secondary winding of a transformer;
   a second switch, coupled to said first switch;
   a saturable inductor, connected in series with said secondary winding of said transformer; wherein a switching voltage is produced across said secondary winding as said transformer is being switched;
   an inductor, coupled to an output terminal of said power converter;
   a current-sensing device, generating a current signal in response to an inductor current of said inductor; and
   a control circuit, coupled to receive said switching voltage and said current signal for generating a first control signal and a second control signal for driving said first switch and said second control switch, respectively.

15. The synchronous rectifying circuit of claim 14, wherein said control circuit is coupled to said second switch for detecting a voltage of said second switch.

16. The synchronous rectifying circuit of claim 14, wherein said saturable inductor inhibits an instant current flowing from said secondary winding of said transformer to said second switch.

17. The synchronous rectifying circuit of claim 14, wherein said first control signal is enabled after said switching voltage is higher than a first threshold; said first control signal is disabled once said switching voltage is lower than a second threshold; said second control signal is enabled once a voltage of said second switch is lower than a fourth threshold; and said second control signal is disabled as long as said current signal is lower than a fifth threshold and said switching voltage is higher than said second threshold.

18. The synchronous rectifying circuit of claim 14, wherein said first control signal is enabled after said switching voltage is higher than a first threshold; said first control signal is disabled once said switching voltage is lower than a second threshold; said second control signal is enabled once a voltage of said second switch is lower than a fourth threshold; and said second control signal is disabled as long as said current signal is lower than a fifth threshold or said switching voltage is higher than said second threshold.

* * * * *